United States Patent
Sakoda et al.

(10) Patent No.: US 10,026,071 B2
(45) Date of Patent: Jul. 17, 2018

(54) COMMUNICATION DEVICE, SERVICE PROVIDING DEVICE, AND COMMUNICATION SERVER

(71) Applicant: SONY CORPORATION, Tokyo (JP)

(72) Inventors: Kazuyuki Sakoda, Chiba (JP); Yoichiro Sako, Tokyo (JP); Kohei Asada, Kanagawa (JP); Katsuhisa Aratani, Kanagawa (JP); Kazuhiro Watanabe, Tokyo (JP); Takatoshi Nakamura, Kanagawa (JP); Mitsuru Takehara, Tokyo (JP); Yuki Koga, Tokyo (JP); Hiroyuki Hanaya, Kanagawa (JP); Tomoya Onuma, Shizuoka (JP); Akira Tange, Tokyo (JP); Kenta Kawamoto, Tokyo (JP); Taizo Shirai, Kanagawa (JP); Masayuki Takada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 482 days.

(21) Appl. No.: 14/434,007

(22) PCT Filed: Aug. 7, 2013

(86) PCT No.: PCT/JP2013/071413
§ 371 (c)(1),
(2) Date: Apr. 7, 2015

(87) PCT Pub. No.: WO2014/061338
PCT Pub. Date: Apr. 24, 2014

(65) Prior Publication Data
US 2015/0262156 A1 Sep. 17, 2015

(30) Foreign Application Priority Data
Oct. 19, 2012 (JP) ................. 2012-231375

(51) Int. Cl.
*H04N 7/18* (2006.01)
*G06F 15/16* (2006.01)
(Continued)

(52) U.S. Cl.
CPC .......... *G06Q 20/16* (2013.01); *H04L 12/282* (2013.01); *H04L 41/0893* (2013.01);
(Continued)

(58) Field of Classification Search
CPC .......... G08B 13/00; H04N 7/18; G06F 15/16; G06F 15/173; H04L 67/16
(Continued)

(56) References Cited

U.S. PATENT DOCUMENTS 6,271,752 B1 * 8/2001 Vaios ............... G08B 13/19608
340/525
7,702,724 B1 * 4/2010 Brydon .................. H04L 67/16
709/203
(Continued)

FOREIGN PATENT DOCUMENTS

EP          1478134 A      11/2004
JP       2002-094556 A      3/2002
(Continued)

OTHER PUBLICATIONS

European Extended Search Report received for European Patent Application No. 13846947.3, dated Mar. 24, 2016, p. 8.
(Continued)

*Primary Examiner* — Clifford Madamba
(74) *Attorney, Agent, or Firm* — Chip Law Group

(57) ABSTRACT

There is provided a communication device including an acceptation unit configured to accept a service execution request for requesting execution of a service, a control unit configured to specify a service providing device to which a request for execution of a service provided by the service
(Continued)

providing device is made based on a device record that includes the service and provision destination group information that indicates a provision destination group of the service, and the service execution request accepted by the acceptation unit, a transmission unit configured to transmit the service execution request to the service providing device specified by the control unit.

12 Claims, 15 Drawing Sheets

(51) Int. Cl.
| | | |
|---|---|---|
| *G06Q 20/16* | (2012.01) | |
| *H04L 12/28* | (2006.01) | |
| *H04W 4/00* | (2018.01) | |
| *H04L 12/24* | (2006.01) | |
| *H04W 4/70* | (2018.01) | |
| *H04L 29/08* | (2006.01) | |
| *H04W 4/08* | (2009.01) | |

(52) U.S. Cl.
CPC .......... *H04L 41/5051* (2013.01); *H04W 4/00* (2013.01); *H04W 4/70* (2018.02); *H04L 67/1044* (2013.01); *H04L 67/12* (2013.01); *H04L 67/16* (2013.01); *H04L 2012/2841* (2013.01); *H04W 4/08* (2013.01)

(58) Field of Classification Search
USPC .......................................................... 705/40
See application file for complete search history.

(56) References Cited

U.S. PATENT DOCUMENTS

| | | |
|---|---|---|
| 2002/0174360 A1 | 11/2002 | Ikeda |
| 2005/0197098 A1 | 9/2005 | Trossen |
| 2009/0319613 A1 | 12/2009 | Hjelm et al. |
| 2012/0218918 A1 | 8/2012 | Takae et al. |

FOREIGN PATENT DOCUMENTS

| | | |
|---|---|---|
| JP | 2004-015495 A | 1/2004 |
| JP | 2004-112784 A | 4/2004 |
| JP | 2004-157938 A | 6/2004 |
| JP | 2005-094495 A | 4/2005 |
| JP | 2007-249956 A | 9/2007 |
| JP | 2010-191971 A | 9/2010 |
| JP | 2011-071922 A | 4/2011 |
| JP | 2012-014541 A | 1/2012 |

OTHER PUBLICATIONS

Office Action for JP Patent Application No. 2014-541982, dated Sep. 12, 2017, 11 pages of Office Action and 07 pages of English Translation.

* cited by examiner

FIG. 10
31-1
| SERVICE ATTRIBUTE | |
|---|---|
| PROVISION GROUP | UNSPECIFIED |
| PROVISION SERVICE | IMAGE INFORMATION (STILL IMAGE DATA WITH LOW IMAGE QUALITY) OF A SPOT |
| COST | 100 |
31-2
| SERVICE ATTRIBUTE | |
|---|---|
| PROVISION GROUP | GROUP ID:ABCDE |
| PROVISION SERVICE | IMAGE INFORMATION (DYNAMIC IMAGE DATA WITH HIGH IMAGE QUALITY) OF A SPOT |
| COST | 10 |

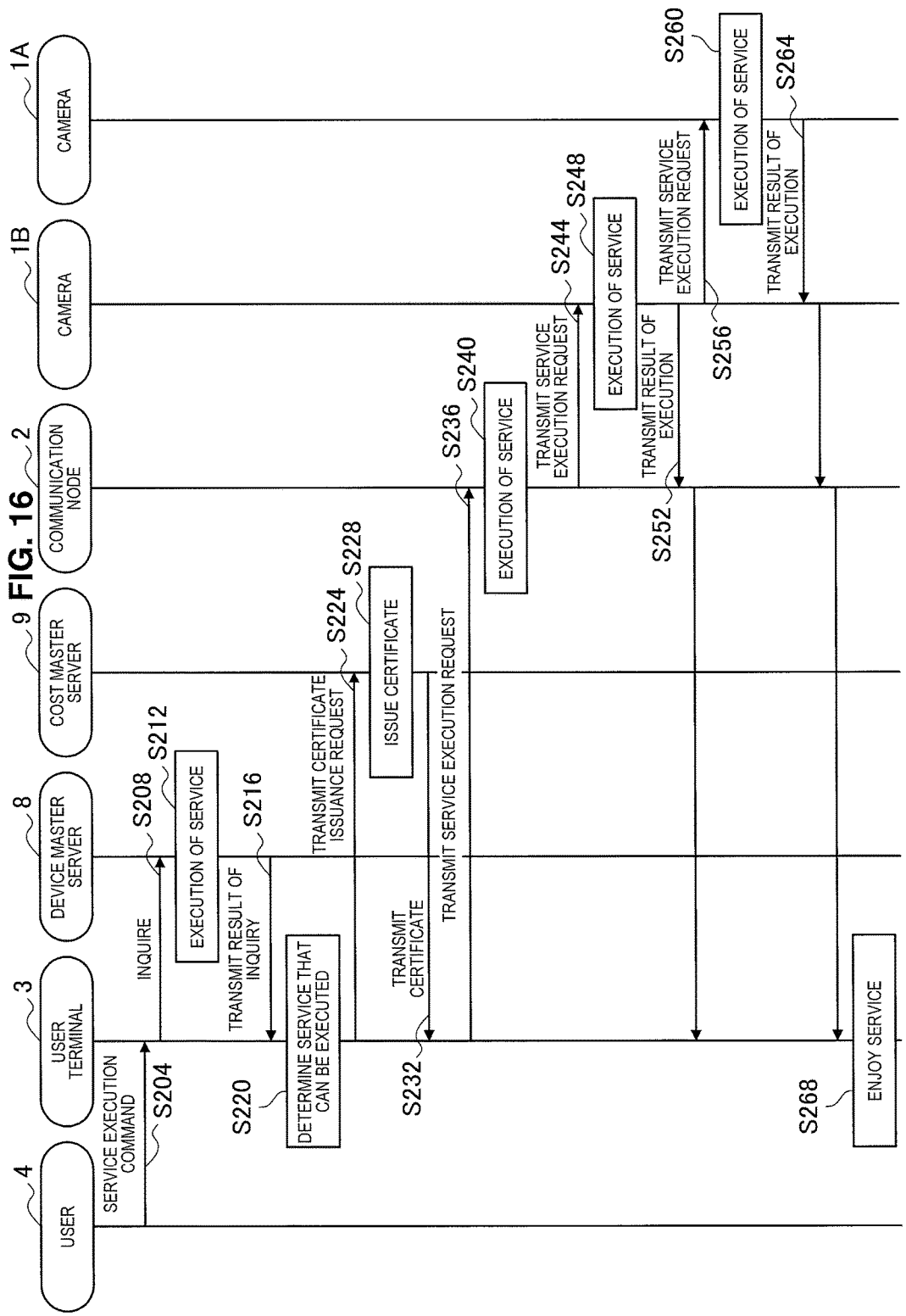

COMMUNICATION DEVICE, SERVICE PROVIDING DEVICE, AND COMMUNICATION SERVER

TECHNICAL FIELD

The present disclosure relates to a communication device, a service providing device, a server, and a storage medium.

BACKGROUND ART

A sensor network system in which a plurality of communication terminals with sensors such as a camera, a microphone, and human-sensing sensor are provided and the respective communication terminals with sensors are controlled in cooperation of the sensors to collect sensor results is known.

In such a sensor network system, data is generally collected through cooperation of communication terminals with sensors that are owned by the same person, and the collected sensor results are managed and referred to by the owner.

In addition, Patent Literature 1 discloses a technology for forming a mesh network in which a plurality of wireless communication terminals perform data relay with one another without increasing the number of base stations and thus there is no constraint on installation locations and costs. In a wireless resource allocation control method of a data relay terminal according to Patent Literature 1, uses of wireless resources by a self-terminal are managed separately from provision of the wireless resources to other terminals.

CITATION LIST

Patent Literature

Patent Literature 1: JP 2011-71922A

SUMMARY OF INVENTION

Technical Problem

Here, since the communication terminals with sensors that are owned by the same person generally collect data cooperatively in the sensor network system described above, there is a problem in that it is not possible to collect sensor results of communication terminals with sensors that are owned by other persons. In other words, communication terminals with sensors provide sensor results only to their owners.

In addition, technology disclosed in Patent Literature 1 described above only distinguishes the uses of wireless resources by the terminals themselves from the provision of wireless resources to other terminals, and performs no control according to the owners of other terminals.

Therefore, a novel and improved communication device, service providing device, server, and storage medium that can constitute a sensor network that has communication terminals with sensors that execute services of different content for respective provision destinations are proposed.

Solution to Problem

According to the present disclosure, there is provided a communication device including an acceptation unit configured to accept a service execution request for requesting execution of a service, a control unit configured to specify a service providing device to which a request for execution of a service provided by the service providing device is made based on a device record that includes the service and provision destination group information that indicates a provision destination group of the service, and the service execution request accepted by the acceptation unit, a transmission unit configured to transmit the service execution request to the service providing device specified by the control unit.

In addition, according to the present disclosure, there is provided a service providing device including a storage unit configured to store a device record that includes a service that is capable of being provided and provision destination group information that indicates a provision destination group of the service, a communication unit configured to receive a service execution request from a communication device, and a control unit configured to control a service execution unit to provide a service requested with the service execution request based on the device record stored in the storage unit.

Furthermore, according to the present disclosure, there is provided a storage medium having a program stored therein, the program causing a computer to execute accepting a service execution request for requesting execution of a service, specifying a service providing device to which a request for execution of a service provided by the service providing device is made based on a device record that includes the service and provision destination group information that indicates a provision destination group of the service, and the accepted service execution request, and transmitting the service execution request to the specified service providing device.

Moreover, according to the present disclosure, there is provided a storage medium having a program stored therein, the program causing a computer to execute receiving a service execution request from a communication device, and controlling a service execution unit to provide a service requested with the service execution request based on a device record that includes a service that is capable of being provided and provision destination group information that indicates a provision destination group of the service.

Advantageous Effects of Invention

According to the present disclosure described above, it is possible to constitute a sensor network that has communication terminals with sensors that execute services of different content for respective provision destinations.

BRIEF DESCRIPTION OF DRAWINGS

FIG. 10 is an illustrative diagram showing an example of a data configuration of a service attribute according to the first embodiment.

FIG. 16 is a sequence diagram showing an operation of the sensor network system according to the second embodiment.

DESCRIPTION OF EMBODIMENTS

Figure 1:
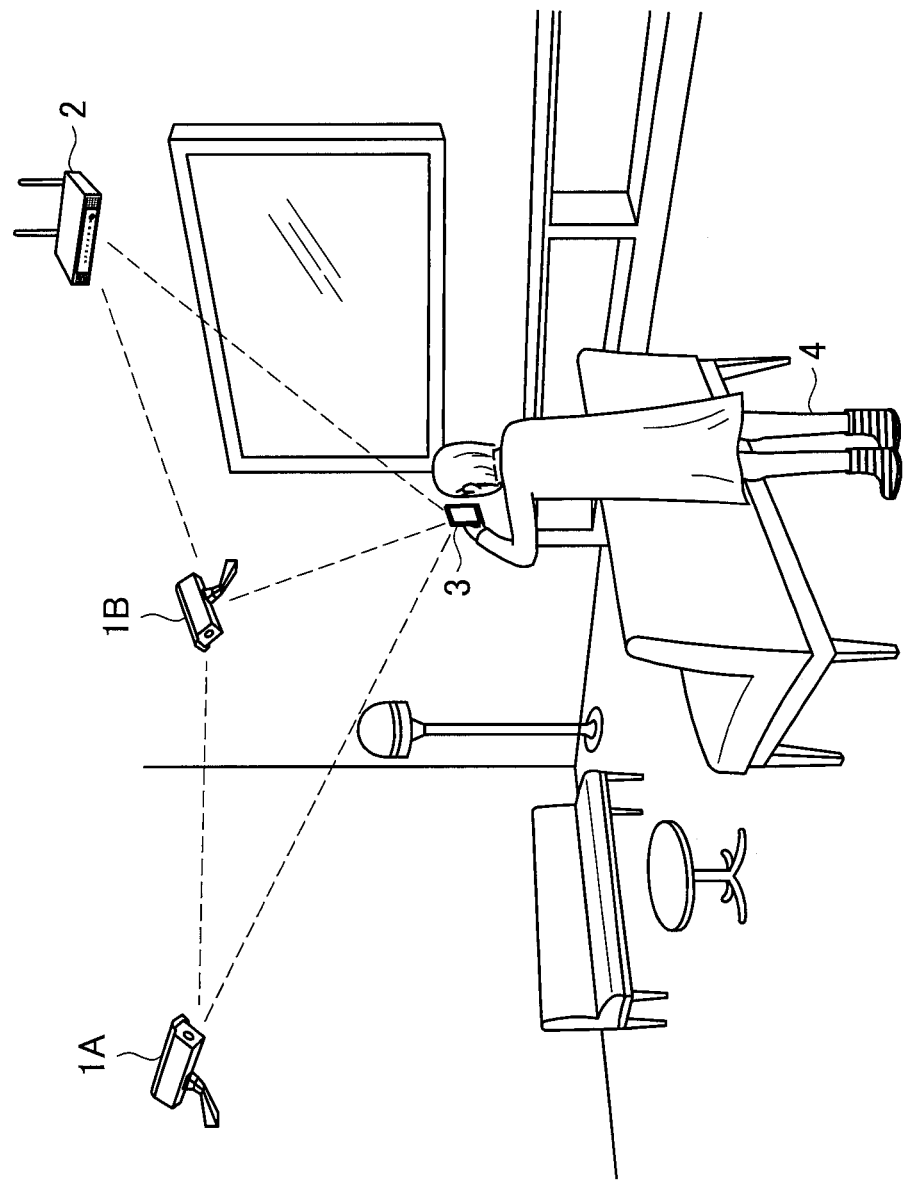
FIG. 1 is an illustrative diagram for describing an overview of a sensor network system according to a present embodiment.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that description will be provided in the following order.
1. Overview of a sensor network system according to an embodiment of the present disclosure
2. Embodiments
2-1. First embodiment
  [2-1-1. Configuration]
  [2-1-2. Operation]
  [2-1-3. Effect]
2-2. Second embodiment
  [2-2-1. Overview]
  [2-2-2. Configuration]
  [2-2-3. Operation]
  [2-2-4. Effect]
3. Conclusion

1. OVERVIEW OF A SENSOR NETWORK SYSTEM ACCORDING TO AN EMBODIMENT OF THE PRESENT DISCLOSURE

A communication device (a communication device 10 mounted on a user terminal 3) provided in a sensor network system according to an embodiment of the present disclosure includes:

A. an acceptance unit (connection unit 14) that accepts a service execution request for requesting execution of a service;

B. a control unit (control unit 11) that specifies a service providing device (the communication device 10 mounted on each of a camera 1, a communication node 2, a control device 5, and a display device 6) to which a request for execution of a service is made based on a device record that includes a service provided by the service providing device and provision destination group information that indicates a provision destination group of the service, and the service execution request accepted by the acceptance unit; and C. a transmission unit (communication unit 13) that transmits the service execution request to the service providing device specified by the control unit.

First, an overview of the sensor network system according to the present embodiment will be described with reference to FIG. 1.

FIG. 1 is an illustrative diagram for describing the overview of the sensor network system according to the present embodiment. As shown in FIG. 1, as a sensor network system, a situation in which a huge number of sensors and actuators are disposed everywhere in the world such as rooms, houses, buildings, outdoor places, regions, and nations or moving objects in the world such as bicycles, motorcycles, automobiles, ships, helicopters, airplanes, and rockets is assumed. As the sensors, for example, cameras 1, microphones, human-sensing sensors, and the like are exemplified. Further, as the actuators, communication nodes 2, lights, televisions, speakers, the control device 5 and the display device 6 to be described later in FIG. 3, and the like are exemplified.

In the example shown in FIG. 1, cameras 1A and 1B, and the communication node 2 are disposed in the lobby of a hotel in which a user 4 is present. The cameras 1A and 1B and the communication node 2 form a sensor network system in which they are connected to each other through wireless communication, and the respective devices store device records that indicate the type of services that each device can provide. In addition, the cameras 1A and 1B and the communication node 2 can request provision of services from each other based on the device records. Note that a device that has sensors or actuators and provides services based on service execution requests such as the cameras 1A and 1B and the communication node 2 is also referred to hereinafter as a service providing device.

A case in which the camera 1B stores a device record that indicates that the communication node 2 can provide a communication service to be performed with the outside, for example, is assumed. When performing communication to the outside that would not be possible by the sole camera 1B, the camera 1B searches for a service providing device that can provide a communication service to be performed with the outside from stored device records of other service providing devices. Then, the camera 1B specifies the communication node 2 as a service providing device that can provide such a service, and then transmits a service execution request for requesting communication with the outside to the communication node 2. Then, the communication node 2 provides the camera 1B with communication with the outside based on the received service execution request.

In addition, the sensor network system constituted by the cameras 1A and 1B and the communication node 2 can perform communication with the user terminal 3 that has moved close thereto. At this time, the user terminal 3 receives the device records of the cameras 1A and 1B and the communication node 2 that are service providing devices disposed in the periphery. Thus, the user terminal 3 can request execution of a service based on the received device records from the cameras 1A and 1B and the communication node 2.

For example, the user 4 can request execution of a service such as photographing him or her in a still image or a dynamic image from the cameras 1A and 1B, and then receive the photographed still image or dynamic image using the user terminal 3 that he or she owns. In addition, as the camera 1 that can photograph the user 4 in a dynamic image, the user terminal 3 can specify the camera 1B that can photograph dynamic images as the camera 1 from which the user terminal requests execution of the service, rather than, for example, the camera 1A that can only photograph still images.

Here, in the present embodiment, there are cases in which a service providing device from which the user 4 requests execution of a service is owned by a user different from the user 4. In a general sensor network, however, data is collected by a service providing device that is owned by the same person, and thus there is a problem in that it is not possible to collect sensor results of communication terminals with sensors that are owned by other persons. In response to this problem, in another field, Patent Literature 1 described above discloses the technology for managing uses of wireless resources in a self-terminal separately from provision of the wireless resources to another terminal with respect to, for example, the wireless resource allocation control method.

In the technology disclosed in Patent Literature 1 described above, however, only the self-terminal and the other terminal are distinguished, and thus there is a problem that it is not possible to control provision of a service (provision of the wireless resources) according to provision destination information such as whether or not the owner of the other terminal is the same as that of the self-terminal and the like.

Thus, a sensor network system of an embodiment of the present disclosure was created taking the above circumstances into consideration. The sensor network system according to each embodiment of the present disclosure can constitute a sensor network having communication terminals with sensors which execute services of different content for respective provision destinations. Hereinbelow, differences between a comparative example and the present embodiment of the sensor network system will be described with reference to FIGS. 2 and 3. Then, a method for sharing and using service providing devices each owned by different users 4 in the sensor network system according to the present embodiment will be described.

Figure 2:
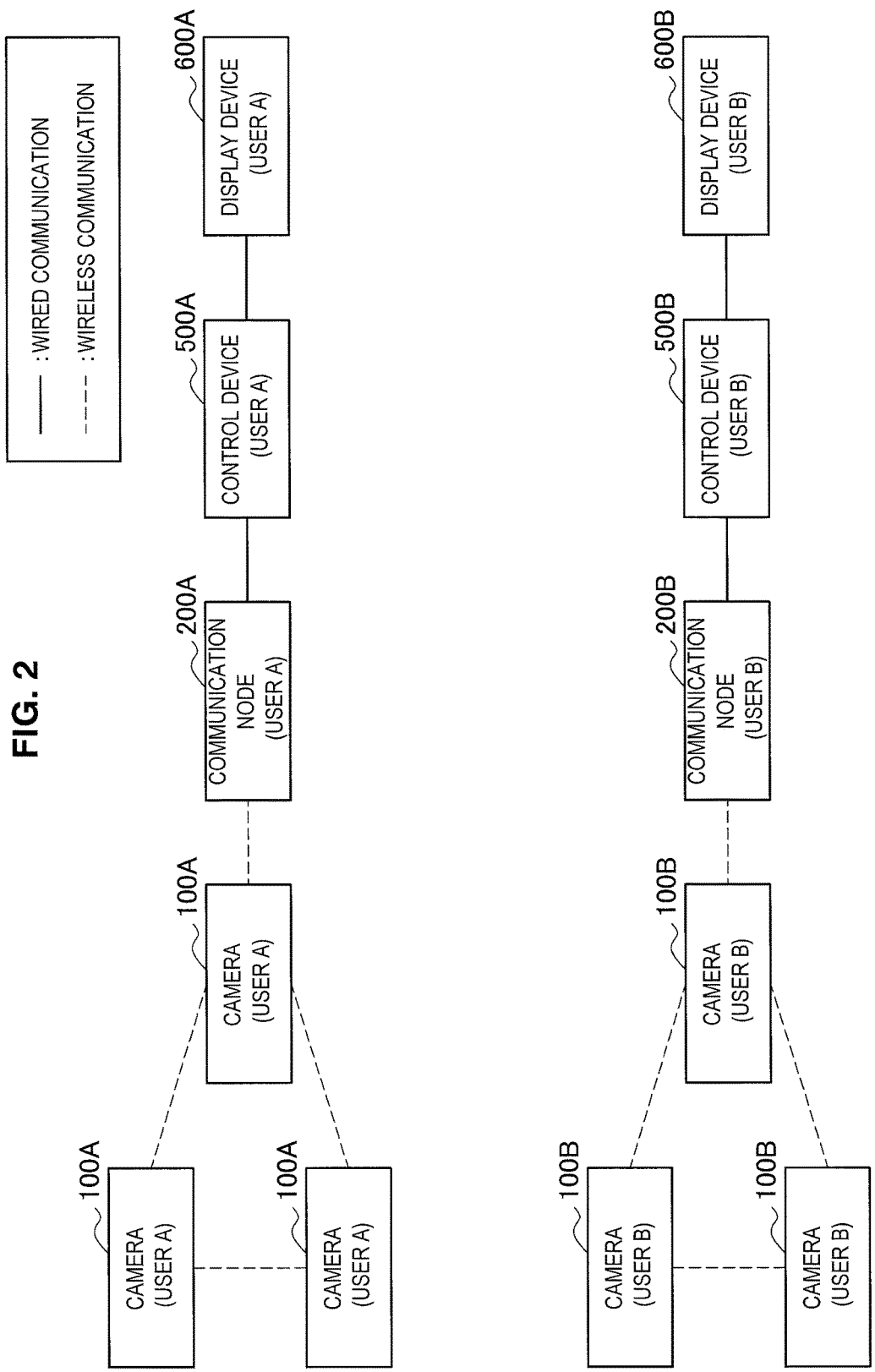
FIG. 2 is an illustrative diagram showing a configuration of a sensor network system according to a comparative example.

FIG. 2 is an illustrative diagram showing a configuration of a sensor network system according to the comparative example. As shown in FIG. 2, the sensor network system according to the comparative example includes cameras 100, communication nodes 200, control devices 500, and display devices 600, which form individual networks for users 4 who own each of them. Note that, in FIG. 2, among the cameras 100, cameras 100 whose owner is a user 4A are referred to as cameras 100A, and the other cameras 100 whose owner is a user 4B are referred to as cameras 100B. The same also applies to the communication nodes 200, the control devices 500, and the display devices 600. Note that, in FIG. 2, the dashed lines indicate connection of respective devices through wireless communication, and the solid lines indicate connection of respective devices through wired communication.

Figure 3:
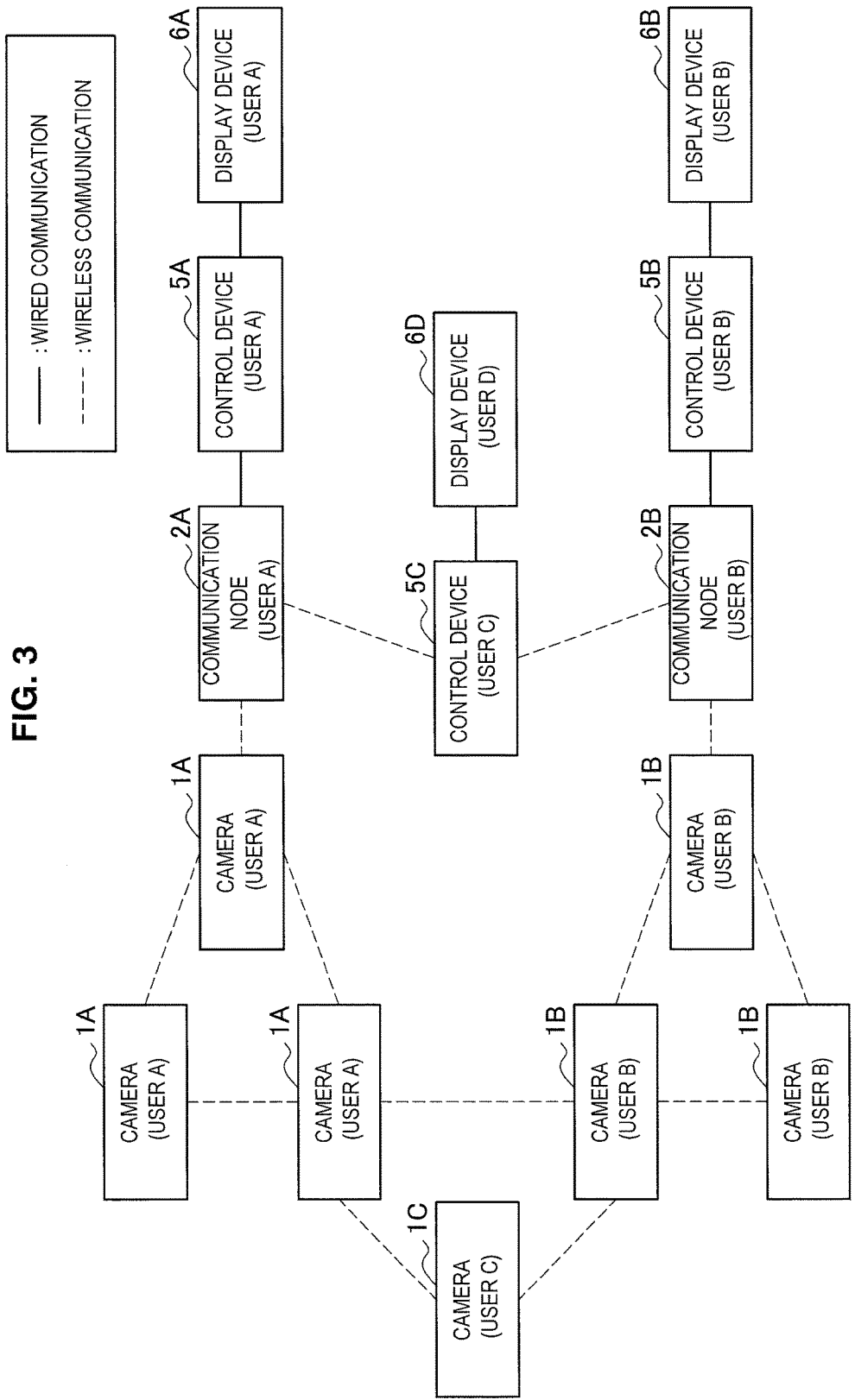
FIG. 3 is an illustrative diagram showing a configuration of the sensor network system according to the present embodiment.

FIG. 3 is an illustrative diagram showing a configuration of the sensor network system according to the present embodiment. As shown in FIG. 3, the sensor network system according to the present embodiment includes a plurality of cameras 1, communication nodes 2, control devices 5, and display devices 6 that are owned by different users 4, each forming one network. Note that, in FIG. 3, among the cameras 1, cameras 1 whose owner is a user 4A are referred to as cameras 1A, other cameras 1 whose owner is a user 4B are referred to as cameras 1B, and the other camera 1 whose owner is a user 4C is referred to as a camera 1C. The same applies to the communication nodes 2, the control devices 5, and the display devices 6. Note that the user terminal 3 described in FIG. 1 above may be regarded as a device that includes the control device 5 and the display device 6.

Next, the differences between the comparative example shown in FIG. 2 and the present embodiment shown in FIG. 3 having the respective configurations described above will be described. First, in the sensor network system according to the comparative example, each control device 500 controls each of the camera 100, the communication node 200, and the display device 600 which are owned by the same user 4 as shown in FIG. 2. To be specific, for example, the control device 500A causes the display device 600A to display videos photographed by the camera 100A. However, since the display device 600A is on the different network from the camera 100B, the control device 500A is not capable of causing the display device 600A to display videos photographed by the camera 100B.

On the other hand, in the sensor network system according to the present embodiment shown in FIG. 3, the control devices 5 can control the cameras 1, the communication nodes 2, and the display device 6 owned by the different users 4.

For this reason, the display device 6A, for example, can display videos photographed by the camera 1B. In addition, it is not necessary in the sensor network system according to the present embodiment that a complete system be formed by the same person, unlike in the comparative example. For this reason, even when the user 4C only installs the camera 1C and the control device 5C and the user 4D only installs the display device 6D, for example, the control device 5C and the display device 6D can form the sensor network system.

In this case, when a user 4 other than an owner requests a service from a service providing device, a provision cost indicating a cost appropriate for the provision of the service is paid to the owner of the service providing device from the user terminal 3. In other words, when the user 4 uses the service providing device owned by another person, he or she pays the corresponding cost to the owner. Here, such a cost may be realized by points, for example, cyber money, virtual coupons, and the like. In that case, the payment of the provision cost from the user 4 to the owner of the service providing device may be realized by transferring points from the user terminal 3 to the service providing device.

For this reason, the user 4 inputs to the user terminal 3 a service that he or she desires and maximum cost information that indicates the maximum number of points to be paid to the service providing device. In addition, the user terminal 3 specifies the service providing device that can provide the service that the user 4 desires and whose provision cost is within the range of the maximum cost information input by the user 4 as a device from which the terminal requests execution of the service.

In addition, the service providing device may set provision destinations and provision costs for respective services to be provided. For example, the service providing device may provide a service at a low cost to a specific provision destination, and on the other hand, may provide the service at a normal cost to another provision destination.

Note that the specification of a service providing device by the user terminal 3, payment of costs, acceptance of costs by the service providing device, and the like described above are realized by a communication module (refer to the communication device 10 of FIG. 4) included in both of the user terminal 3 and the service providing device.

The overview of the sensor network system according to the embodiment of the present disclosure has been described above. Next, a configuration of the sensor network system will be described in detail with reference to FIGS. 4 to 10.

2. EMBODIMENTS

2-1. First Embodiment

2-1-1. Configuration

Figure 4:
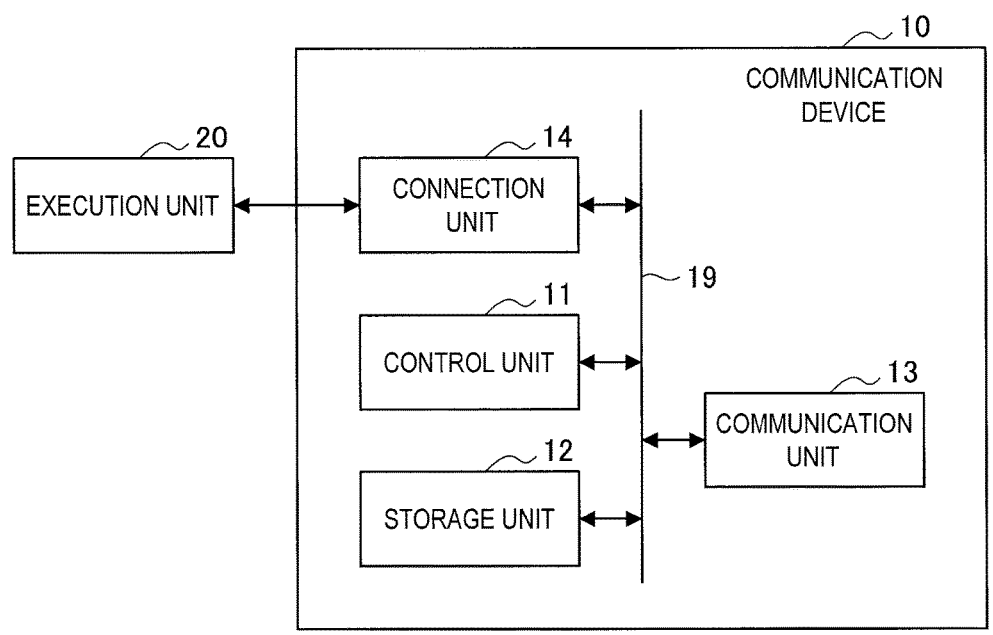
FIG. 4 is a block diagram showing a configuration of a communication device according to a first embodiment.

FIG. 4 is a block diagram showing a configuration of a communication device according to a first embodiment. As shown in FIG. 4, the communication device 10 includes a control unit 11, a storage unit 12, and a communication unit 13, and the respective constituent elements are connected to each other via a bus 19. In addition, the communication device 10 can communicate with an execution unit 20. As described above, the communication device 10 is a communication module that is commonly included in the cameras 1, the communication nodes 2, and other service providing devices forming a sensor network system, and the user terminal 3 and other devices as well.

In addition, the communication device 10 performs specification of a service providing device from which the user terminal 3 requests execution of a service, payment of a cost, acceptance of the cost by the service providing device, and the like. With regard to the respective constituent elements of the communication device 10, a case in which the communication device 10 is mounted in a service providing device will be described first, and then a case in which the communication device 10 is mounted in the user terminal 3 will be described hereinbelow.

(Service Providing Device)

Execution Unit

The execution unit 20 is an external device such as a sensor actuator that operates in linkage with the communication device 10. The execution unit 20 of each of the camera 1, the communication node 2, and the display device 6 will be exemplified hereinbelow with reference to FIGS. 5 to 7.

Figure 5:
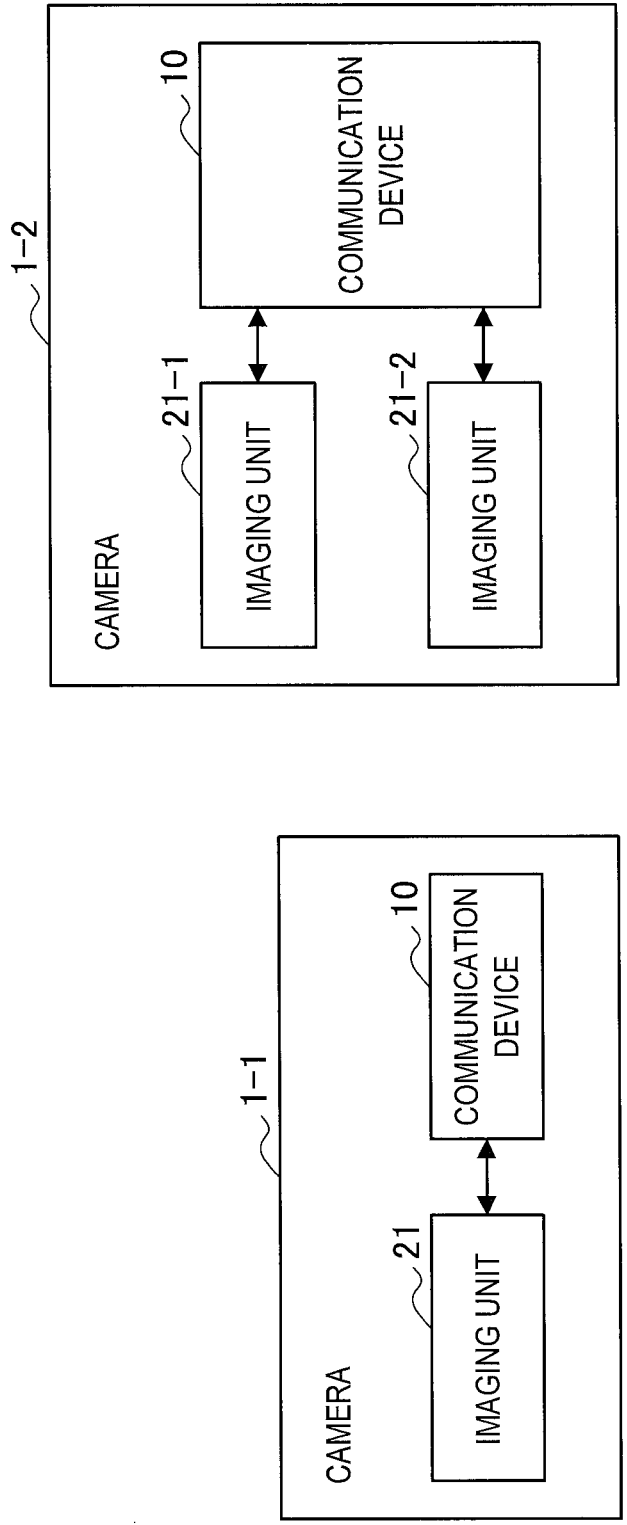
FIG. 5 is a block diagram showing an application example of the communication device according to the first embodiment to a service providing device.
Figure 6:
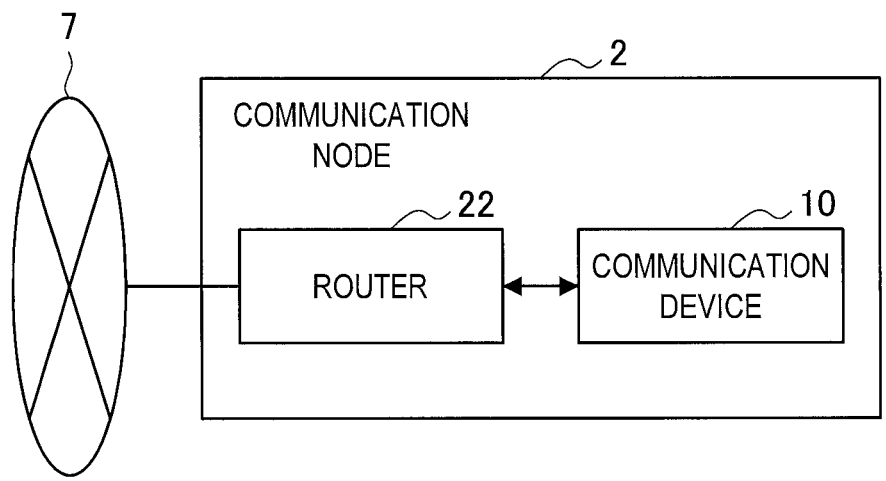
FIG. 6 is a block diagram showing another application example of the communication device according to the first embodiment to a service providing device.
Figure 7:
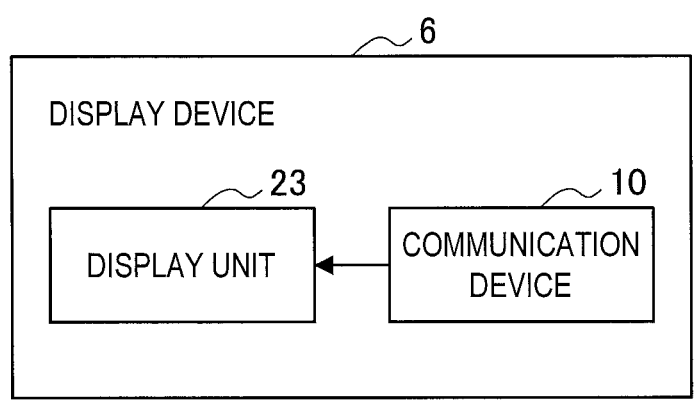
FIG. 7 is a block diagram showing still another application example of the communication device according to the first embodiment to a service providing device.

FIGS. 5 to 7 are block diagrams showing application examples of the communication device 10 according to the first embodiment to service providing devices. As shown in FIG. 5, a camera 1-1 has the communication device 10, and an imaging unit 21 that photographs still images and dynamic images serving as the execution unit 20. In addition, a plurality of execution units 20 may be provided, as in a camera 1-2 that includes an imaging unit 21-1 and another imaging unit 21-2. In addition, as shown in FIG. 6, the communication node 2 has the communication device 10 and a router 22 that serves as the execution unit 20 being connected to a network 7 to perform communication with the outside. In addition, the display device 6 has the communication device 10 and a display unit 23 that displays videos and images received by the communication device 10 thereon serving as the execution unit 20 as shown in FIG. 7.

Connection Unit

The connection unit 14 is an interface through which data exchange with the execution unit 20 is performed. For example, the connection unit 14 transmits control commands with respect to the execution unit 20 issued by the control unit 11 to the execution unit 20, and transmits execution results from the execution unit 20 to the control unit 11.

Storage Unit

The storage unit 12 stores device records that indicate content of services executed by the execution unit 20. In addition, the storage unit 12 may store payment cost information that indicates payment of provision costs from the user terminal 3. To be more specific, the storage unit 12 may store information that indicates transfer of points from the user terminal 3. Note that a data configuration of the device record stored in the storage unit 12 will be described later with reference to FIGS. 9 and 10.

Control Unit

The control unit 11 functions as an arithmetic processing device and a control device, controlling overall operations performed within the communication device 10 according to various programs. The control unit 11 is realized by, for example, a central processing unit (CPU) or a microprocessor. Note that the control unit 24 may include a read only memory (ROM) that store programs to be used, arithmetic parameters, and the like, and a random access memory (RAM) that temporarily stores parameters that are appropriately changed, and the like.

To be more specific, the control unit 11 controls the execution unit 20 such that the execution unit provides a service that the user terminal 3 requests by a service execution request based on a device record stored in the storage unit 12. The control unit 11 may transmit an execution result output from the execution unit 20 to the communication unit 13 by packetizing the result in order to cause the communication unit 13 to transmit the result.

Communication Unit

The communication unit 13 performs communication with other communication devices 10 based on control by the control unit 11. The communication unit 13, for example, may receive a service execution request from the user terminal 3 and transmit an execution result from the execution unit 20 to the user terminal 3. In addition, the communication unit 13 may transmit a device record to other communication devices 10 such as the user terminal 3. Further, the communication unit 13 may receive payment cost information that indicates payment of a cost for provision of a service by the user terminal 3 from the user terminal 3. In addition to that, the communication unit 13 may transmit a service execution request (a second service execution request) to another service providing device. Note that communication performed in the communication unit 13 may be wireless communication or wired communication.

Note that the communication unit 13 may not necessarily transmit the execution result from the execution unit 20 to the user terminal 3. For example, when a service execution request for turning lighting equipment that is not illustrated on is received, the communication unit 13 may transmit no execution result to the user terminal 3 after the lighting equipment is on.

(User Terminal)

Execution Unit

The execution unit 20 is an external device such as an input and output device that operates in linkage with the communication device 10. Hereinbelow, the execution unit 20 of the user terminal 3 will be exemplified with reference to FIG. 8.

Figure 8:
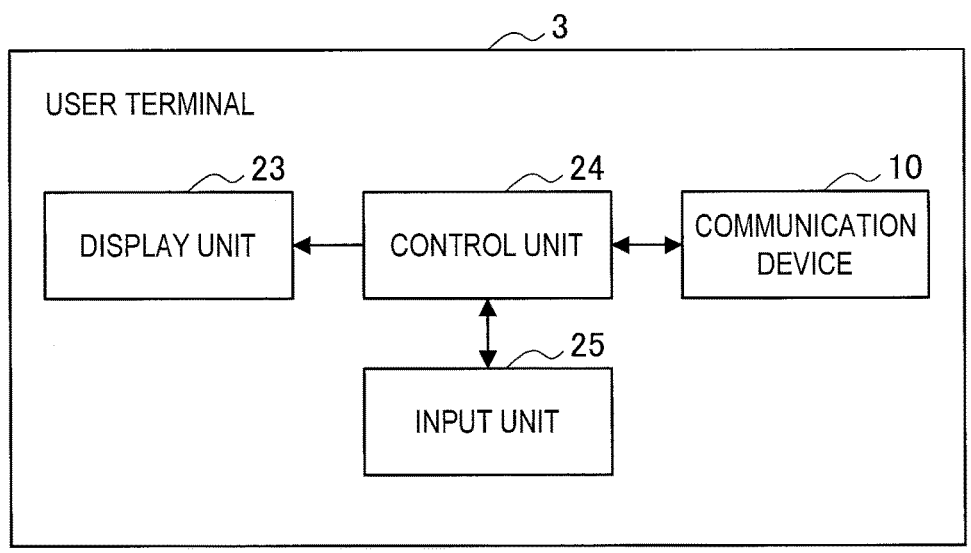
FIG. 8 is a block diagram showing a provision example of the communication device according to the first embodiment to a user terminal.

FIG. 8 is a block diagram showing a provision example of the communication device 10 according to the first embodiment to the user terminal 3. As shown in FIG. 8, the user terminal 3 has the communication device 10, and a display unit 23 that functions as the execution unit 20, a control unit 24, and an input unit 25. The control unit 24 controls the display unit 23 and the input unit 25 based on output results from the communication device 10. The display unit 23 displays videos and images received by the communication device 10 which is a service provided by a service providing device upon service execution requests. The input unit 25 receives inputs of service execution requests in which the user 4 requests execution of desired services and maximum cost information that indicates costs that can be paid for the execution of services.

Connection Unit

The connection unit 14 is an interface with which data exchange with the execution unit 20 is performed. For example, the connection unit 14 transmits control commands with respect to the execution unit 20 issued by the control unit 11 to the execution unit 20, and transmits execution results from the execution unit 20 to the control unit 11. Note that the connection unit 14 functions as an acceptance unit that accepts service execution requests and maximum cost information input by the user 4.

Storage Unit

The storage unit 12 stores a device record of a service providing device disposed in the periphery of the user terminal 3. In addition, the storage unit 12 stores maximum cost information as the balance of points that the user terminal 3 can transfer to the service providing device. Note that, when the user terminal 3 transfers points to the service providing device, the maximum cost information is updated by deducting the amount of the points therefrom.

Control Unit

The control unit 11 specifies the service providing device from which to request execution of a service based on the device record stored in the storage unit 12 and a service execution request that the input unit 25 accepts from the user 4. To be more specific, when the device record includes the service of which execution is to be requested and a provision cost can be paid, the control unit 11 specifies the service providing device indicated by the device record as a service providing device from which to request the execution of the service.

Communication Unit

The communication unit 13 performs communication with other communication devices 10 based on control by the control unit 11. The communication unit 13, for example, transmits the service execution request to the service providing device specified by the control unit 11. In addition, the communication unit 13 may receive the device record from the service providing device. Further, the communication unit 13 may transmit the payment cost information to the service providing device. Note that communication performed by the communication unit 13 may be wireless communication or wired communication.

(Device Record)

The configuration of the communication device 10 according to the present embodiment has been described above. The data configuration of the device record will be described hereinbelow with reference to FIGS. 9 and 10.

Figure 9:
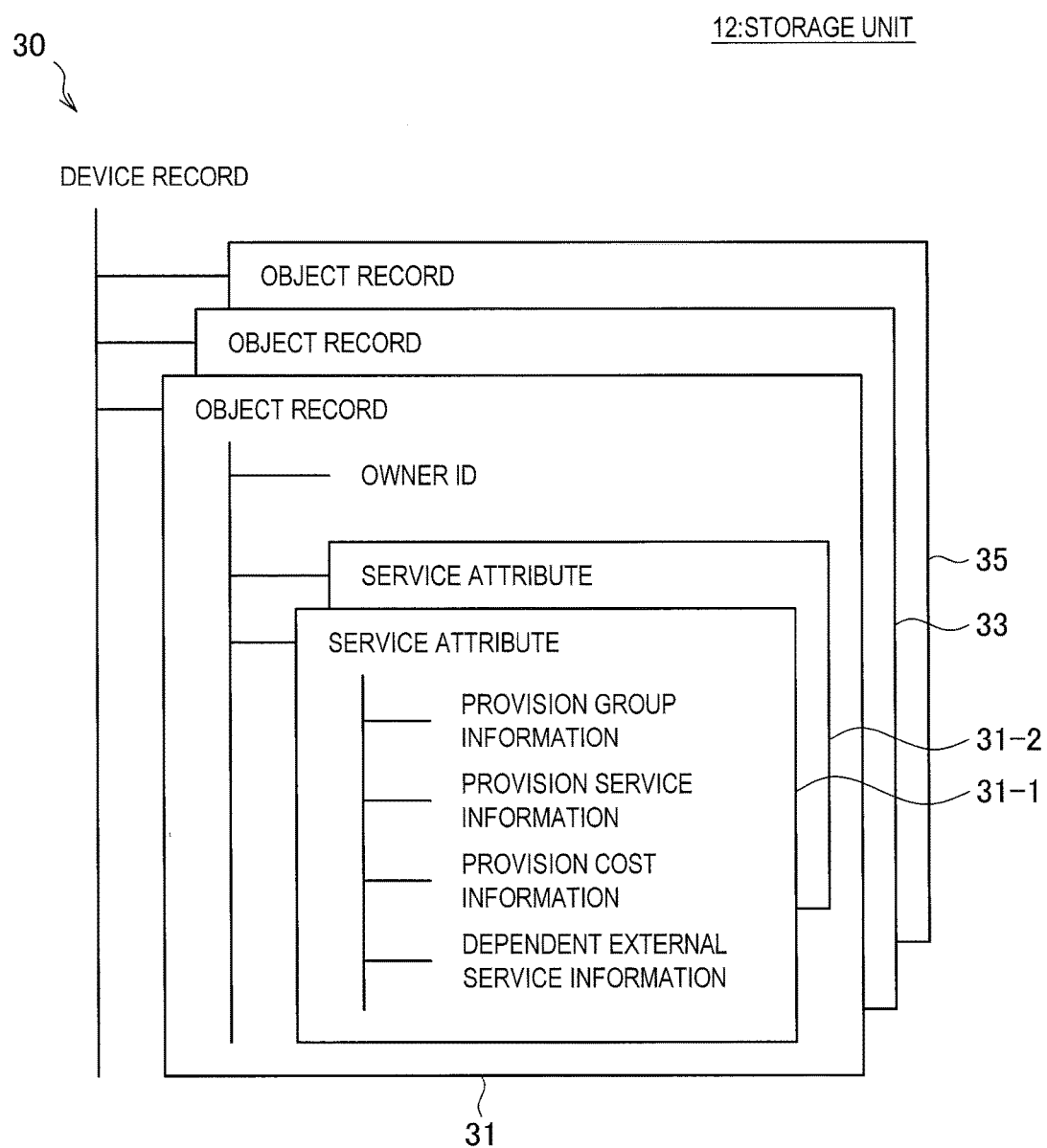
FIG. 9 is an illustrative diagram showing a data configuration of a device record according to the first embodiment.

FIG. 9 is an illustrative diagram showing the data configuration of the device record according to the first embodiment. As shown in FIG. 9, the device record 30 includes object records 31, 33, and 35, and the object record further includes service attributes 31-1 and 31-2. One device record may have a plurality of object records, and one object record may further have a plurality of service attributes.

The device record is present in each service providing device that provides a service, and retains information regarding the service that the service providing device can provide. The object records are present in each execution unit 20, and retain information regarding a service that the execution unit 20 provides. For example, the camera 1-2 that has the imaging unit 21-1 and the imaging unit 21-2 as the execution unit 20 retains the object record 31 regarding the imaging unit 21-1 and the object record 32 regarding the imaging unit 21-2 in the device record. Note that each object record retains an owner ID that is an identifier for identifying the owner of the execution unit 20 and service attributes.

The service attributes are present for each service that the execution unit 20 provides, and retain attributes of the service that the execution unit 20 provides. In more detail, the service attributes include provision group information that indicates the provision destination of the service, provision service information that indicates content of the service, and provision cost information that indicates a provision cost. For example, the same service (for example, photographing of a still image with the same resolution) may be provided to different provision destinations by the camera 1 at different provision costs. In addition, even the same provision destination may be provided with different services (photographing of a still image with different resolutions) at different provision costs.

In addition, the service attributes may include dependent external service information that indicates another execution unit 20 or another service providing device on which provision of the service depends. For example the dependent external service information retains the necessity of data relay by the communication node 2 when the camera 1 provides a service depending on data relay by the communication node 2. Hereinbelow, a specific example of data configurations of the service attributes will be described with reference to FIG. 10.

FIG. 10 is an illustrative diagram showing an example of the data configurations of the service attributes according to the first embodiment. Note that the service attributes included in the device record of the camera 1A of FIG. 1 are shown and the dependent external service information is omitted in FIG. 10. An A spot is assumed to be the lobby of the hotel in which the user 4 shown in FIG. 1 is present.

As shown in FIG. 10, the service attribute 31-1 indicates that the execution unit 20 provides still image data of low image quality of the A spot to unspecified users 4, i.e., all user terminals 3 or service providing devices at a cost of 100. In addition, the service attribute 31-2 indicates that the execution unit 20 provides dynamic image data of high image quality of the A spot to the user terminal 3 or a service providing device owned by a user who belongs to a group ID of ABCDE at a cost of 10. Note that the execution unit 20 may provide services at costs according to qualities of services. For example, the execution unit 20 may provide the dynamic image data of high image quality at the cost of 100 and the still image data of low image quality at the cost of 10.

2-1-2. Operation

The configuration of the sensor network system according to the present embodiment has been described above. Next, an operation of the sensor network system according to the present embodiment will be described with reference to FIG. 11.

Figure 11:
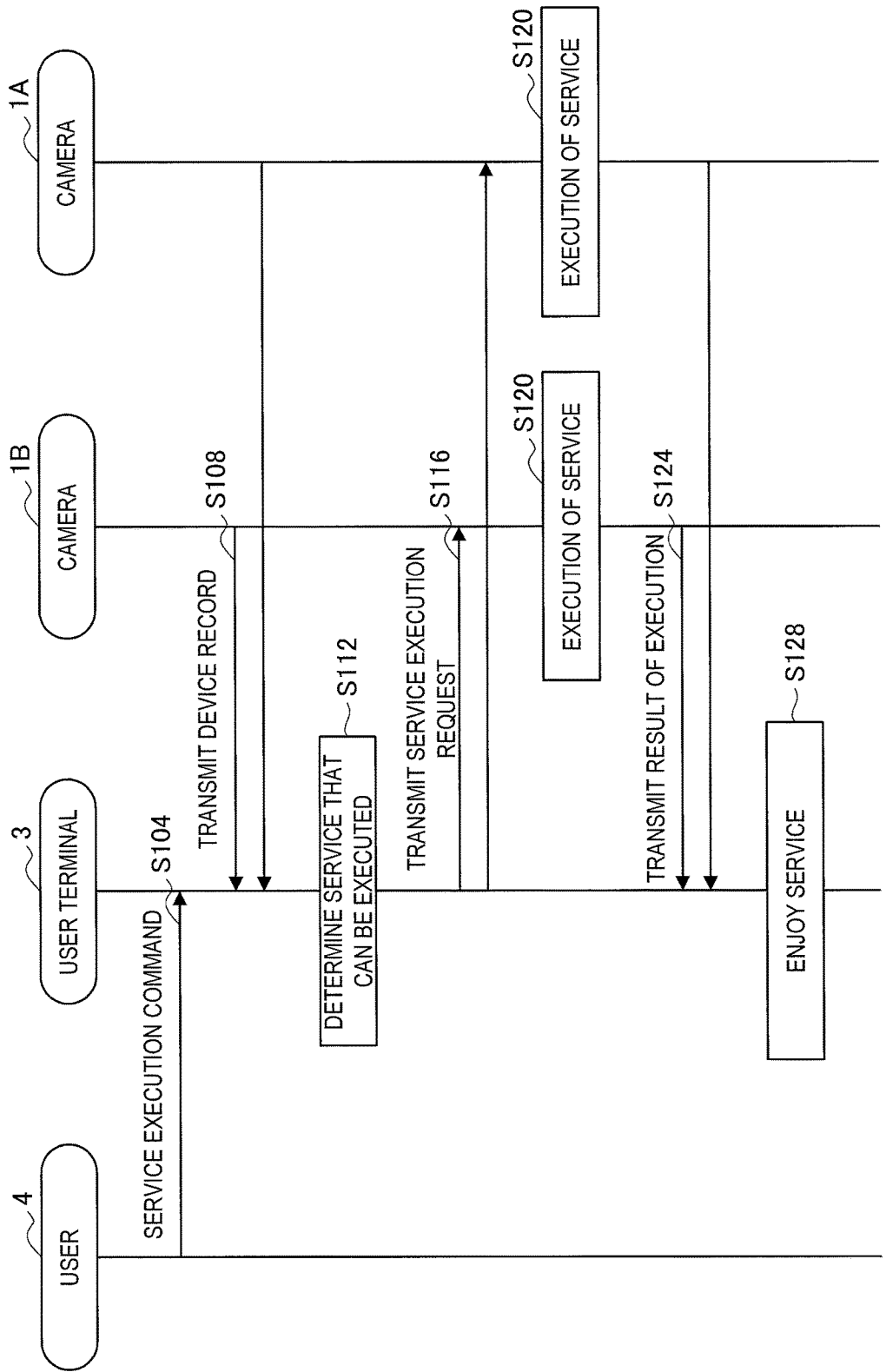
FIG. 11 is a sequence diagram showing an operation of the sensor network system according to the first embodiment.

FIG. 11 is a sequence diagram showing the operation of the sensor network system according to the first embodiment. In FIG. 11, a process sequence of a request made by the user 4 with respect to the cameras 1A and 1B to capture his or her own figure via the user terminal 3 in FIG. 1 is shown. Note that the lobby of the hotel in which the user 4 shown in FIG. 1 is present is referred to hereinbelow as the A spot.

First, the user 4 inputs a service execution command to the user terminal 3 in Step S104. Here, the service execution command includes a service execution request and maximum cost information. For example, the user 4 inputs the service execution request for requesting photographing of his or her own figure and the maximum cost information indicating that up to 1500 points are allowed to the user terminal 3.

Next, the user terminal 3 searches for a service providing device that can execute a service that the user 4 desires in Step S108. To be specific, the user terminal 3 receives a report signal including device records transmitted from the cameras 1A and 1B. Here, for example, the service providing device may periodically transmit the report signal toward the periphery, or the user terminal 3 may transmit a trigger signal to the service providing device disposed in the periphery and then the service providing device that has received the trigger signal may transmit the report signal toward the periphery. In addition, the user terminal 3 may, for example, save the device record of the service providing device disposed in the periphery in advance.

Then, the user terminal 3 determines an executable service in Step S112. In more detail, the user terminal 3 specifies the service providing device to which a service execution request is to be transmitted based on the device record included in the received report signal and the service execution command input by the user 4. Then, the user terminal 3 transmits the service execution request to the specified service providing device in Step S116.

Hereinbelow, a specific example of a process with regard to the camera 1A in Steps S112 and S116 will be described. Note that the device record of the camera 1A is assumed to include the object records including the service attributes 31-1 and 31-2 described in FIG. 10 above. In addition, the user 4 is assumed not to belong to the group indicated by the group ID of ABCDE.

According to the service attribute 31-2, since the provision service is image information of the A spot, the user terminal 3 can enjoy the service of photographing the user 4 present at the A spot. In addition, since the provision cost is 10, the user terminal 3 can enjoy this service within the range of 1500 points indicated by the maximum cost information. The provision destination, however, is limited to the group with the group ID of ABCDE and the user 4 does not belong to this group, and thus the user terminal 3 is not able to enjoy this service. As described above, since the service attribute 31-2 fails to meet all of the conditions indicated by the service execution command, the user terminal 3 is determined not to be able to enjoy the service indicated by the service attribute 31-2.

On the other hand, according to the service attribute 31-1, since the provision service is image information of the A spot, the user terminal 3 can enjoy the service of photographing the user 4 present in the A spot. In addition, since the provision cost is 100, the user terminal 3 can enjoy the service within the range of 1500 points indicated by the maximum cost information. Furthermore, since the provision destination is unspecified, the user terminal 3 can enjoy this service. As described above, since the service attribute 31-1 meets the conditions indicated by the service execution command, the user terminal 3 is determined to be able to enjoy the service indicated by the service attribute 31-1.

As described above, by analyzing the service attributes, it is determined whether or not the user terminal 3 can enjoy the service in Step S112.

Next, the user terminal 3 transmits a service execution request to the camera 1A in Step S116. Here, the user terminal 3 transmits payment cost information that affirms transfer of 100 points that is the provision cost from the user 4 who is the owner of the user terminal 3 to the owner of the camera 1A, along with the service execution request. At this moment, the user terminal 3 updates the maximum cost information to 1400 points by deducting the 100 points therefrom, in order to transfer the 100 points to the owner of the camera 1A.

The specific example of the process with respect to the camera 1A in Steps S112 and S116 has been described above. Description will continue hereinbelow on the assumption that the cameras 1A and 1B have device records that include the service attributes that meet the condition indicated by the service execution command. In addition, the user terminal 3 is assumed to specify the cameras 1A and 1B as service providing devices that can photograph a figure of the user 4.

Next, the cameras 1A and 1B perform photographing based on the received service execution request in Step S120. At this time, the cameras 1A and 1B determine whether or not the received service execution request meets the condition indicated by the service attributes, and performs photographing when the conditions are met. To be specific, when the device record includes the service indicated by the service execution request, payment cost information that indicates payment of the provision cost by the user terminal 3 is received, and the user 4 belongs to the provision destination group, the cameras 1A and 1B perform photographing. When the payment cost information has not been received, for example, the cameras 1A and 1B do not perform photographing.

Next, the cameras 1A and 1B transmit photographed data to the user terminal 3 in Step S124. Then, the user terminal 3 receives the photographed data and thereby the user 4 enjoys his or her desired service in Step S128.

(Supplement)

Although the user terminal 3 is set to transmit the service execution request together with payment cost information to the service providing devices, the present disclosure is not limited to this example. The user terminal 3 may transmit the payment cost information after, for example, the service providing devices provide the service. For example, the user terminal 3 may cause the cameras 1A and 1B to execute photographing without transferring points, and cause the user 4 to select his or her desired image from photographed images. Then, the user terminal 3 may only transfer points to the camera 1 that has photographed the image selected by the user 4. Accordingly, the user terminal 3 can provide a service that the user 4 prefers.

In addition, the example in which the user terminal 3 can enjoy the service because the provision cost is within the range of the maximum cost information has been described above; however, when the provision cost is not within the range of the maximum cost information, the user terminal 3 is not able to enjoy the service. When, for example, the maximum cost information is 100 points, the user terminal 3 can enjoy a service for which the provision cost is 10 points, but is not able to enjoy a service for which the provision cost is 150 points.

2-1-3. Effect

As described above, each service providing device constituting the sensor network system is used by the users 4 other than the owner thereof according to the present embodiment. Thus, the users 4 can use the service providing device owned by another person. In addition, each service providing device receives transfer of points for its use from the users 4 other than the owner. Thus, each user 4 is motivated to allow other persons to use his or her own service providing device. For this reason, the number of service providing devices forming the sensor network system is expected to increase in comparison to a case in which no gain such as points is obtained even though other persons are allowed to use the service providing devices.

In addition, each service providing device can execute services of different content for each provision destination. For this reason, the service providing device can control the services by, for example, providing a superior service to a group to which the user 4 who is the owner thereof belongs, providing a service with limited quality to other groups, and the like.

2-2. Second Embodiment

A second embodiment is an embodiment in which the user terminal 3 receives provision of a service from service providing devices disposed in a remote location. First, an overview of a sensor network system according to the present embodiment will be described with reference to FIG. 12.

2-2-1. Overview

Figure 12:
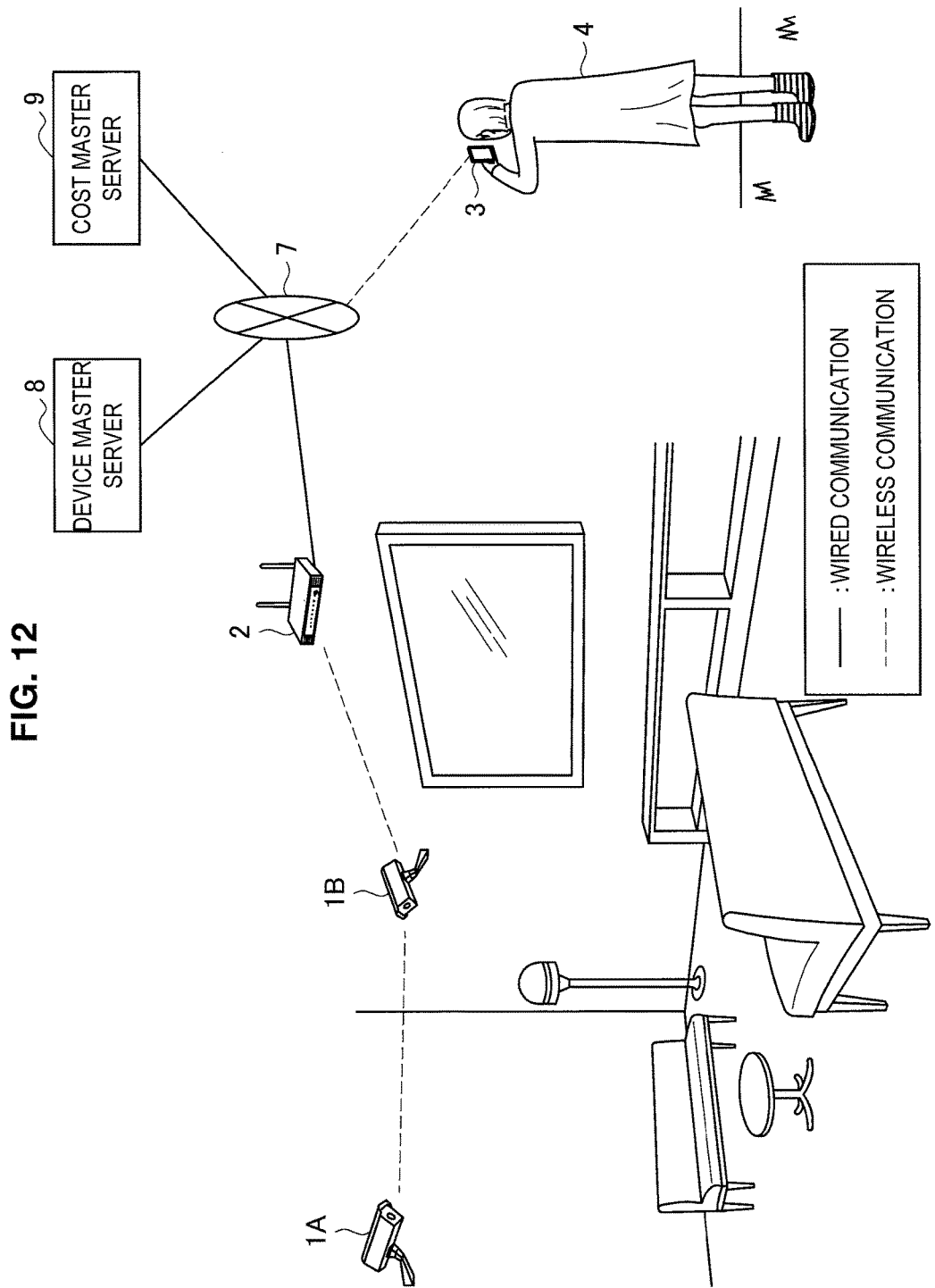
FIG. 12 is an illustrative diagram for describing an overview of a sensor network system according to a second embodiment.

FIG. 12 is an illustrative diagram for describing an overview of the sensor network system according to the second embodiment. As shown in FIG. 12, the cameras 1A and 1B and the communication node 2 are disposed in the lobby of a hotel, and are connected to a device master server 8 and a cost master server 9 via the network 7.

In addition, the cameras 1A and 1B and the communication node 2 are accessed by the user terminal 3 present in the remote location via the network 7. In more detail, the user terminal 3 transmits a service execution request to the service providing devices disposed in the remote location, and thereby enjoys the service. In this case, the user terminal 3 specifies a service providing device to which the service execution request is transmitted by inquiring to the device master server 8 about what kind of service providing device is present in the remote location.

The device master server 8 receives and manages device records from service providing devices. In addition, when there is an inquiry from the user terminal 3, the device master server 8 transmits connection destination information of the service providing device that can provide the service that the user 4 desires to the user terminal 3. Then, the user terminal 3 transmits the service execution request to the service providing device based on the received connection destination information.

In addition, as described in <2-1. First embodiment>, there are cases in which the user 4 is not included in a provision destination group of a service by a service providing device. In this case, the user terminal 3 performs a process for causing the user 4 to belong to the provision destination group of the service by the service providing device using the cost master server 9. To be more specific, the user terminal 3 transmits a certificate issuance request (belonging group information issuance request) for requesting issuance of a certificate (belonging group information) that indicates that the user terminal 3 belongs to the provision destination group to the cost master server 9. Then, the cost master server 9 issues the certificate of various group IDs.

Here, in the present specification, when the user terminal 3 has a certificate of a certain group ID, the user 4 who is the owner of the user terminal 3 is assumed to belong to the group indicated by the group ID.

2-2-2. Configuration

The overview of the sensor network system according to the present embodiment has been described above. Next, a configuration of the sensor network system according to the present embodiment will be described with reference to FIGS. 13 to 15.

(Device Master Server)

Figure 13:
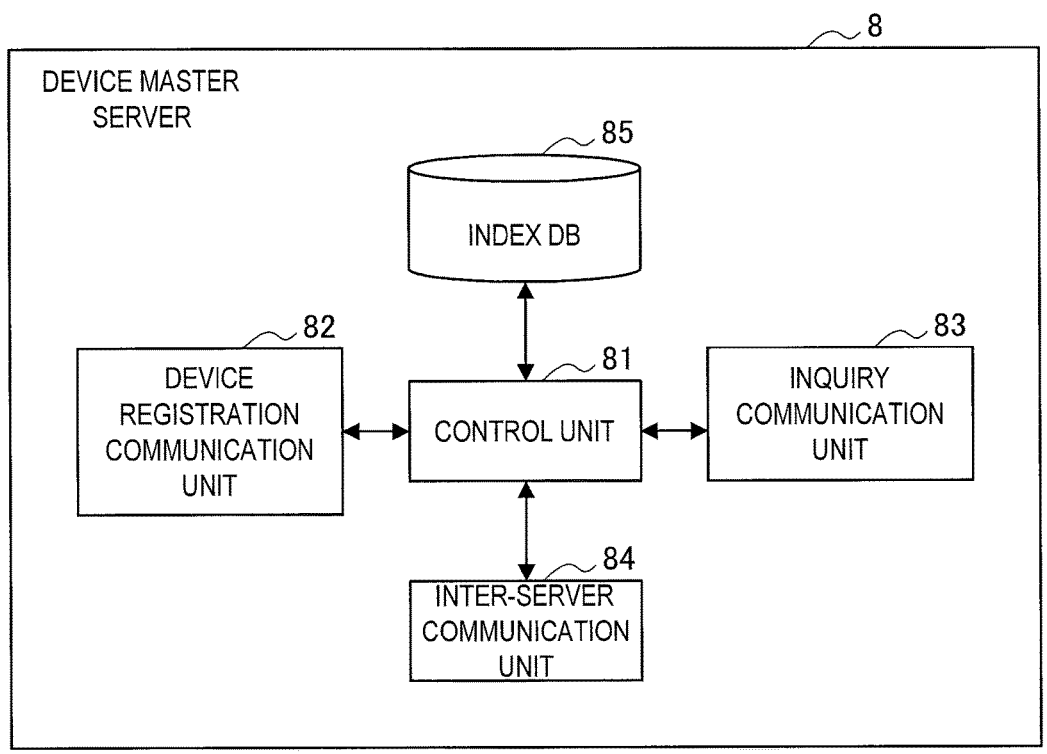
FIG. 13 is a block diagram showing a configuration of a device master server according to the second embodiment.

FIG. 13 is a block diagram showing the configuration of the device master server 8 according to the second embodiment. As shown in FIG. 13, the device master server 8 includes a control unit 81, a device registration communication unit 82, an inquiry communication unit 83, an inter-server communication unit 84, and an index DB 85.

Device Registration Communication Unit

The device registration communication unit 82 performs communication with service providing devices connected via the network 7. To be more specific, the device registration communication unit 82 receives device records transmitted from the service providing devices. Then, the device records received by the device registration communication unit 82 are stored in the index DB 85. Note that the device master server 8 may set, for example, a management range based on the type of a service providing device, geographic information or the like, or may cause only the device records of service providing devices under its supervision to be stored in the index DB 85.

Inquiry Communication Unit

The inquiry communication unit 83 performs communication with the service providing devices or the user terminal 3 connected on the network 7. To be more specific, the inquiry communication unit 83 receives inquiries about service providing devices that can provide specific services (target services) transmitted from the service providing devices or the user terminal 3. Then, the inquiry communication unit 83 outputs the content of the inquiries to the control unit 81, and transmits inquiry results output by the control unit 81 to the service providing devices or the user terminal 3.

Control Unit

The control unit 81 functions as an arithmetic processing device and a control device, and controls overall operations performed within the device master server 8 according to various programs. To be more specific, the control unit 81 searches for a service providing device that can execute a target service indicated by an inquiry received by the inquiry communication unit 83 from the index DB 85. Then, when a device record that includes the target service is stored in the index DB 85, the inquiry communication unit 83 is caused to transmit the device record to the inquiring source. Note that, when the device record that includes the target service is not stored in the index DB 85, the control unit 81 inquires about the target service to another device master server 8 through the inter-server communication unit 84.

Inter-Server Communication Unit

The inter-server communication unit 84 inquires about service providing devices that can execute specific services to another device master server 8 as described above. For example, the device master server 8 may transfer a received inquiry to another device master server 8, and transfer a device record which the other device master server 8 has searched for and replied with to the service providing device or the user terminal 3 that is the inquiring source. In addition, when there is the same inquiry from another device master server 8, the inter-server communication unit 84 transmits an inquiry result by the control unit 81 to the other device master server 8. Note that the inter-server communication unit 84 may exchange information that indicates the device records of the service providing devices stored in the index DB 85 with the other device master server 8.

Index DB

The index DB 85 manages types of services and service providing devices that can provide the services. To be specific, the index DB 85 stores device records of at least one or more service providing devices. In this case, the index DB 85 stores the device records received by the device registration communication unit 82 as index data records. Hereinbelow, a data configuration of an index data record will be described with reference to FIG. 14.

(Index Data Record)

Figure 14:
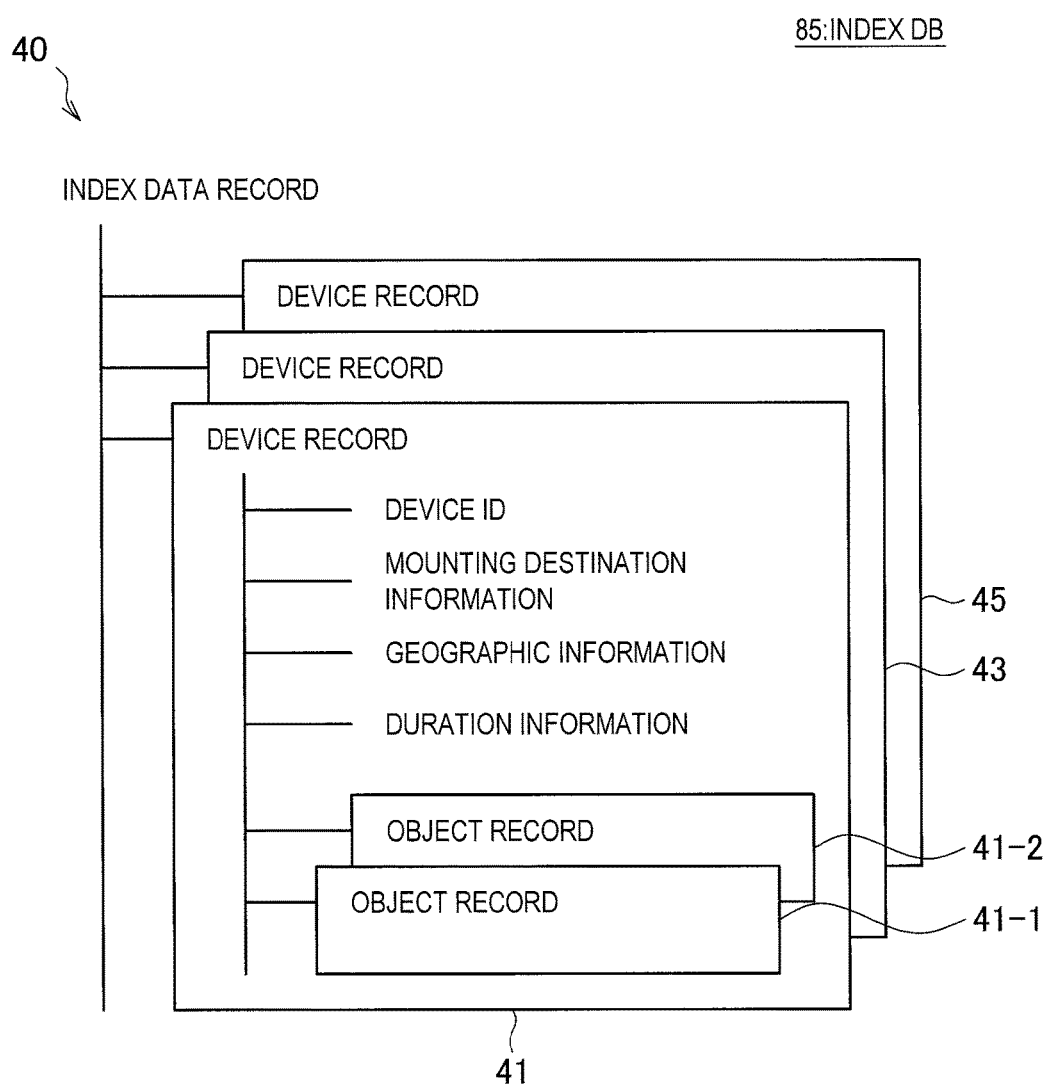
FIG. 14 is an illustrative diagram showing a data configuration of an index data record according to the second embodiment.

FIG. 14 is an illustrative diagram showing the data configuration of the index data record according to the second embodiment. As shown in FIG. 14, the index data record 40 includes device records 41, 43, and 45, and the device records further include object records 41-1 and 41-2. One index data record may have a plurality of device records, and one device record may have a plurality of object records.

The index data record retains the device records which are information regarding services that can be provided by the service providing device present under supervision of the device master server 8. Each device record according to the present embodiment includes a device ID, mounting destination information, geographic information, and duration information, in addition to the device record described in <2-1. First embodiment>.

Here, the device ID is an ID for identifying a service providing device. The device ID may be used as connection destination information when the user terminal 3 transmits a service execution request to the service providing device.

In addition, the mounting destination information is information that indicates an object in which a service providing device is installed. For example, the mounting destination information includes information such as whether a service providing device is fixed to a wall of a building, a street lamp, or the like, or installed in a moving object such as an automobile, or a satellite.

In addition, the geographic information is information that indicates a position at which a service providing device is installed at the time at which the device record thereof is received by the device registration communication unit 82 and registered in the index DB 85. The geographic information includes, for example, longitude, latitude, a height from a ground surface, the number of stories of a building, and the like at which the service providing device is installed.

In addition, the duration information is information that indicates the term of validity of the device record. The duration information includes, for example, information that indicates the date and time on which the term of validity expires. In addition, when the term of validity indicated by the duration information expires, the device registration communication unit 82 transmits a trigger signal for requesting transmission of a device record to a service providing device, and causes the device record to be transmitted again, and thereby updates the index DB 85. Here, when a mounting destination of the service providing device is a moving object, the duration information may be set to be shorter than when the mounting destination is a wall of a building, a street lamp, or the like. For this reason, when the mounting destination of the service providing device is a moving object, the device record is updated often, and thus even when the mounting destination is moved, the control unit 81 can search for the device record based on geographic information of the movement destination.

(Cost Master Server)

Figure 15:
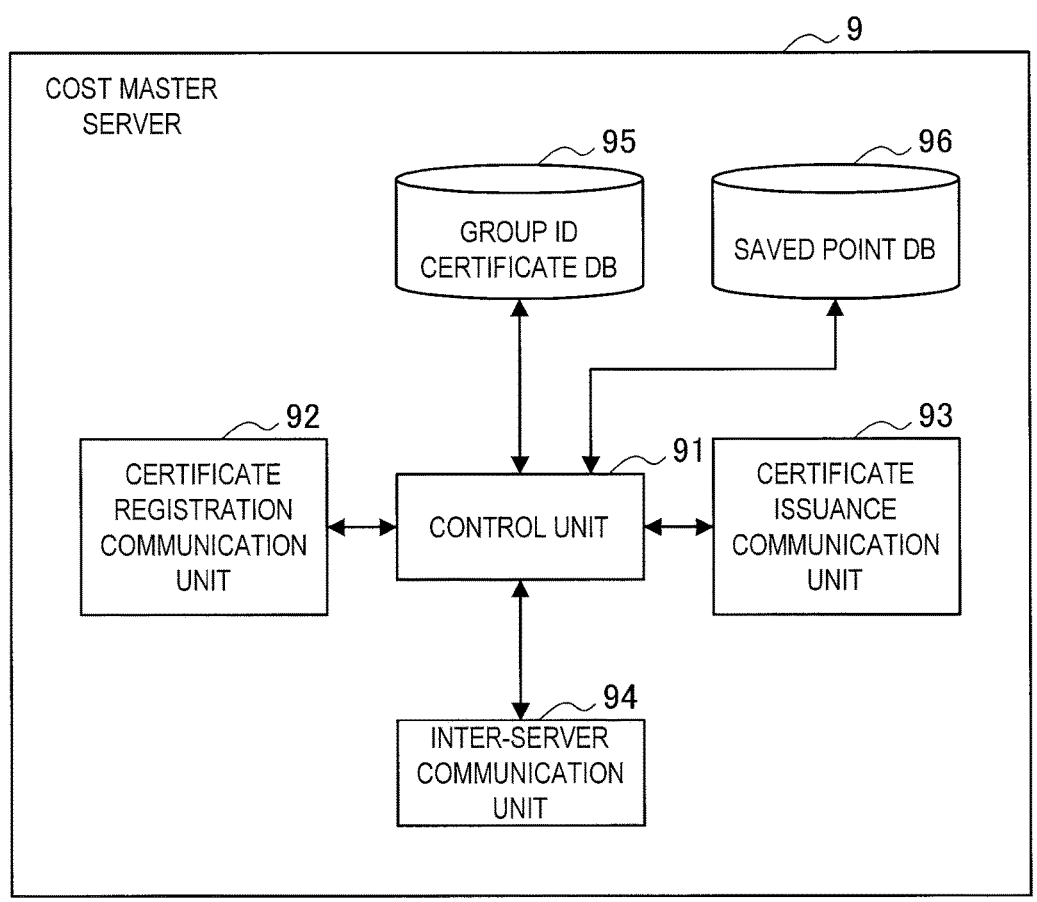
FIG. 15 is a block diagram showing a configuration of a cost master server according to the second embodiment.

FIG. 15 is a block diagram showing a configuration of the cost master server 9 according to the second embodiment. As shown in FIG. 15, the cost master server 9 includes a control unit 91, a certificate registration communication unit 92, a certificate issuance communication unit 93, an inter-server communication unit 94, a group ID certificate DB 95, and a saved point DB 96.

Certificate Registration Communication Unit

The certificate registration communication unit 92 performs communication with a service providing device or an arbitrary information processing device connected via the network 7. To be more specific, the certificate registration communication unit 92 receives a certificate registration request transmitted from the service providing device or the arbitrary information processing device. Here, such a certificate registration request includes a certificate for which registration is requested, an issuance cost that indicates points to be transferred for issuance of the certificate, and the term of validity of the certificate. Then, the certificate received by the certificate registration communication unit 92 is stored in the group ID certificate DB 95 in association with the issuance cost and the term of validity thereof. Note that the cost master server 9 may cause only certificates of groups set as provision destinations of services by the service providing devices under its supervision to be stored in the group ID certificate DB 95 like the device master server 8.

Certificate Issuance Communication Unit

The certificate issuance communication unit 93 performs communication with a service providing device or the user terminal 3 connected via the network 7. To be more specific, the certificate issuance communication unit 93 receives a certificate issuance request for requesting issuance of a certificate (a belonging group information issuance request) transmitted from the service providing device or the user terminal 3. In this case, the certificate issuance communication unit 93 may receive issuance cost information that indicates payment of the issuance cost transmitted from the service providing device or the user terminal 3. In addition, the certificate issuance communication unit 93 issues the certificate indicated by the certificate issuance request and transmits the certificate to the service providing device or the user terminal 3 that is the request source according to control of the control unit 91.

Control Unit

The control unit 91 functions as an arithmetic processing device and control device, and controls overall operations performed within the cost master server 9 according to various programs. To be more specific, when a certificate issuance request is received by the certificate issuance communication unit 93, the control unit 91 searches for the certificate indicated by the certificate issuance request from the group ID certificate DB 95. Then, when the certificate indicated by the certificate issuance request has been stored in the group ID certificate DB 95 and the issuance cost information that indicates payment of the issuance cost has been received, the control unit 91 may cause the certificate to be issued. Then, the control unit 91 may cause the certificate issuance communication unit 93 to transmit the issued certificate to the service providing device or the user terminal 3 that is the transmission source of the certificate issuance request. Note that, when the certificate indicated by the certificate issuance request is not stored in the group ID certificate DB 95, the control unit 91 causes the inter-server communication unit 94 to inquire about the certificate to another cost master server 9.

Inter-Server Communication Unit

The inter-server communication unit 94 inquires about whether or not a specific certificate can be issued to the other cost master server 9 as described above. This inquiry is made by, for example, transmitting the certificate issuance request to the other cost master server 9. To be specific, the cost master server 9 may transfer the received certificate issuance request to the other cost master server 9, and the certificate issued by the other cost master server 9 may be transferred to the service providing device or the user terminal 3 that is the transmission source of the certificate issuance request. In addition, when there is the same inquiry from the other cost master server 9, the inter-server communication unit 94 transmits the certificate issued by the control unit 91 to the other cost master server 9. Note that the inter-server communication unit 94 may exchange information that indicates certificates stored in the group ID certificate DB 95 with the other cost master server 9.

Group ID Certificate DB

The group ID certificate DB 95 stores certificates, issuance costs, and the terms of validity in association with each other. Here, the term of validity may indicate the term in which the certificate is stored in the group ID certificate DB 95. Note that, when the term of validity of a certificate stored in the group ID certificate DB 95 expires, the certificate registration communication unit 92 may transmit a trigger signal for requesting updating to the transmission source of the certificate registration request. In addition to that, the term of validity may indicate a time from when the user terminal 3 receives issuance of the certificate to when the certificate is not usable.

Saved Point DB

The saved point DB 96 manages transfer of points between respective users 4 with regard to payment of the issuance cost for a certificate. For example, the saved point DB 96 stores information that indicates transfer of points from each user 4 that is the transmission source of a certificate issuance request when the certificate has been issued.

(Supplement)

Although the example in which the device master server 8 and the cost master server 9 are separated when the sensor network system is formed has been shown in the above description, the present disclosure is not limited to this example. The device master server 8 and the cost master server 9 may be formed, for example, integrally.

2-2-3. Operation

The configuration of the sensor network system according to the present embodiment has been described above. Next, an operation of the sensor network system according to the present embodiment will be described with reference to FIG. 16.

FIG. 16 is a sequence diagram showing the operation of the sensor network system according to the second embodiment. In FIG. 16, the process sequence when the user 4 requests execution of a service to photograph a state of the lobby of the hotel that is a remote location in FIG. 12 from the cameras 1A and 1B via the user terminal 3 is shown. Note that the lobby of the hotel shown in FIG. 12 will be referred to hereinafter as an A spot.

First, the user 4 inputs a service execution command to the user terminal 3 in Step S204. For example, the user 4 inputs a service execution request for requesting for his or her desire to photograph a state of the A spot in a dynamic image and information that up to 1500 points is allowed as the maximum cost information to the user terminal 3.

Next, the user terminal 3 searches for a service providing device that can execute the service that the user 4 desires in Step S208. To be specific, the user terminal 3 inquires about a service providing device that can photograph a state of the A spot in a dynamic image to the device master server 8.

Next, the device master server 8 searches for a service providing device that can photograph a state of the A spot in a dynamic image from index data records stored in the index DB 85 in Step S212. Then, the device master server 8 transmits the device records of corresponding service providing devices to the user terminal 3 in Step S216.

The device records of the cameras 1A and 1B are assumed to, for example, include service attributes of photographing a state of the A spot. Here, the user terminal 3 determines that the cameras 1A and 1B are able to photograph the state of the A spot based on mounting destination information and geographic information included in the device records. In addition, dependent external service information of the service attributes is assumed to include the necessity of going through the communication node 2 for communication with a remote location. In this case, the device master server 8 transmits the device records of the cameras 1A and 1B and the communication node 2 to the user terminal 3.

Next, the user terminal 3 determines an executable service in Step S220. In more detail, the user terminal 3 specifies a service providing device to which a service execution request is to be transmitted based on the device records transmitted from the device master server 8 and the service execution command input by the user 4. When issuance of a certificate is necessary for enjoying the service, however, the user terminal 3 transmits a certificate issuance request to the cost master server 9 in Step S224. Then, the cost master server 9 issues the certificate in Step S228, and then transmits the issued certificate to the user terminal 3 in Step S232.

Hereinbelow, a specific example of a process with respect to the camera 1A performed in Steps S220 to S232 will be described. Note that the device record of the camera 1A is assumed to include the object record that includes the service attributes 31-1 and 31-2 described in FIG. 10 above. In addition, the user 4 is assumed not to belong to the group indicated by the group ID of ABCDE.

The user terminal 3 determines whether or not the service can be enjoyed by analyzing the service attributes in Step S220. First, since the provision service is image information in the form of a still image of the A spot according to the service attribute 31-1, the user terminal 3 is not able to enjoy the service of photographing the state of the A spot in a dynamic image indicated by the service execution request.

On the other hand, since the provision service is image information in the form of a dynamic image of the A spot according to the service attribute 31-2, the user terminal 3 can enjoy the service of photographing the state of the A spot in a dynamic image. In addition, since the provision cost is 10, the user terminal 3 can enjoy this service within the range of 1500 points indicated by the maximum cost information. The provision destination, however, is limited to the group whose group ID is ABCDE.

Therefore, the user terminal 3 can enjoy the service indicated by the service execution request through the camera 1A; however, it is determined that it is necessary for the user terminal to belong to the group whose group ID is ABCDE. In addition, since the provision cost is 10, the user terminal 3 is determined to be able to pay up to 1490 points that is obtained by deducting the provision cost from the maximum cost so as to belong to the group whose group ID is ABCDE.

In addition, the user terminal 3 also computes the cost for the dependent external service, and determines whether or not it is able to enjoy the service. For example, since transfer of photographed data by the camera 1B and the communication node 2 is necessary with respect to execution of the service by the camera 1A, the user terminal 3 computes the provision cost for the service by adding the cost incurred for the transfer to the cost for the photographing by the camera 1A. Then, it is determined that the points obtained by deducting the aforementioned provision cost from the maximum cost information can be paid to belong to the group whose group ID is ABCDE; however, this will be omitted herein for the sake of simplification.

Next, the user terminal 3 transmits the certificate issuance request for requesting issuance of the certificate of the group ID of ABCDE to the cost master server 9 in Step S224. At this time, the user terminal 3 transmits information that it can transfer up to 1490 points to the cost maser server 9 as issuance cost information. Then, the cost master server 9 issues the certificate of the group ID of ABCDE in Step S228. At this time, when the issuance cost is 200 points, for example, the saved point DB 96 stores the payment of 200 points from the user 4, and then the user terminal 3 updates maximum cost information to 1300 points by deducting 200 points therefrom. Then, the cost master server 9 transmits the issued certificate of the group ID of ABCDE to the user terminal 3 in Step S232.

The specific example of the process with respect to the camera 1A performed in Steps S212 to S232 has been described above. Hereinbelow, it is assumed that the cameras 1A and 1B can execute the service indicated by the service execution command and the necessary certificate for the user terminal 3 has been issued.

Next, a service execution request that connotes the certificate is transmitted to the communication node 2 in Step S236. Note that this service execution request is for requesting transfer of the service execution request with respect to the cameras 1A and 1B to the communication node 2. Note that, when the term of validity of the transmitted certificate expires, the cameras 1A and 1B do not perform photographing, and thus the user terminal 3 is not able to enjoy the service.

Next, the communication node 2 executes the service in Step S240. To be specific, the service execution request received from the user terminal 3 is transferred to the camera 1B in Step S244. Note that this service execution request is for requesting photographing by the camera 1B and transfer of the service execution request with respect to the camera A to the camera 1B. In addition, the communication node 2 receives the provision cost information from the user terminal 3, and then accepts transfer of points.

Then, the camera 1B that has received the service execution request from the communication node 2 executes the service in Step S248. To be specific, the camera 1B performs photographing of the A spot in a dynamic image, and then transmits photographed data to the user terminal 3 via the communication node 2 in Step S252. Further, a service execution request with respect to the camera 1A transferred from the communication node 2 is transferred to the camera 1A in Step S256. Note that this service execution request is for requesting photographing by the camera 1A. In addition, the camera 1B receives the provision cost information from the user terminal 3 via the communication node 2, and then accepts transfer of points.

Then, the camera 1A that has received the service execution request from the camera 1B executes the service in Step S260. To be specific, the camera 1A performs photographing of the A spot in a dynamic image, and then transmits photographed data to the user terminal 3 via the camera 1B and the communication node 2 in Step S264. In addition, the camera 1A receives the provision cost information from the user terminal 3 via the communication node 2 and the camera 1B, and then accepts transfer of points.

Then, the user terminal 3 receives the photographed data photographed by the cameras 1A and 1B, and thereby the user 4 enjoys his or her desired service in Step S268.

2-2-4. Effect

As described above, the user terminal 3 can be provided with a service from service providing devices that are present in a remote location according to the present embodiment. In this case, the user terminal 3 can cause the device master server 8 to search for service providing devices that can execute its desired service, and thus it is not necessary to inquire about whether or not the service is executed to the individual service providing devices that are present in the remote location.

In addition, the user terminal 3 can receive an issued certificate using the cost master server 9. For this reason, the user terminal 3 can receive a service by paying an issuance cost of the certificate even if the service is provided to a limited group.

3. CONCLUSION

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, although it is assumed that transfer of points between respective users with regard to provision of a service is performed between the devices and the cost master server 9 manages transfer of points between respective users 4 for payment of an issuance cost for issuance of a certificate in the embodiments described above, the present technology is not limited thereto. For example, the cost master server 9 may manage transfer of points between respective users with regard to provision of a service. Then, transfer of points may be realized as the user terminal 3 transmits the payment cost information to the cost master server 9, rather than to the service providing devices.

In addition, although the user terminal 3 is set to request execution of a service to the service providing devices in the embodiments described above, the present technology is not limited thereto. For example, the user terminal 3 may request a service from another user terminal 3. In this case, the user terminal 3 can acquire, for example, an image photographed by a camera that the other user terminal 3 includes.

Additionally, the present technology may also be configured as below.

(1)

A communication device including:

an acceptation unit configured to accept a service execution request for requesting execution of a service;

a control unit configured to specify a service providing device to which a request for execution of a service provided by the service providing device is made based on a device record that includes the service and provision destination group information that indicates a provision destination group of the service, and the service execution request accepted by the acceptation unit;

a transmission unit configured to transmit the service execution request to the service providing device specified by the control unit.

(2)

The communication device according to (1), wherein the device record includes provision cost information for the service.

(3)

The communication device according to (2), wherein the transmission unit transmits payment cost information that indicates payment of a cost indicated by the provision cost information for the service to the service providing device specified by the control unit based on the device record.

(4)

The communication device according to any one of (1) to (3), wherein, when the device record includes the service of which execution is to be requested and the communication device is capable of paying a provision cost for the service, the control unit specifies the service providing device indicated by the device record as the service providing device to which a service execution request is made.

(5) (Belonging Group Information=Certificate)

The communication device according to any one of (1) to (4), wherein, when the service execution request is transmitted to the service providing device specified by the control unit, the transmission unit transmits belonging group information that indicates a group to which the communication device belongs.

(6)

The communication device according to (5), wherein, when a group to which the communication device belongs is not included in the provision destination group indicated by the provision destination group information, the control unit controls the transmission unit to transmit, to a server, a belonging group information issuance request for requesting issuance of belonging group information that indicates that the communication device belongs to the provision destination group.

(7)

A service providing device including:

a storage unit configured to store a device record that includes a service that is capable of being provided and provision destination group information that indicates a provision destination group of the service;

a communication unit configured to receive a service execution request from a communication device; and a control unit configured to control a service execution unit to provide a service requested with the service execution request based on the device record stored in the storage unit.

(8)

The service providing device according to (7), wherein the device record includes provision cost information for the service.

(9)

The service providing device according to (7) or (8), wherein the communication unit transmits a result of the execution by the service execution unit to the communication device.

(10)

The service providing device according to (8), wherein the communication unit receives payment cost information that indicates payment of a cost indicated by the provision cost information for the service from the communication device.

(11)

The service providing device according to (10), wherein the communication unit receives belonging group information that indicates a group to which the communication device belongs; and wherein, when a group indicated by the belonging group information is included in the provision destination group indicated by the provision destination group information and the payment cost information has been received by the communication unit, the control unit controls the service execution unit to execute the service.

(12)

The service providing device according to any one of (7) to (11), wherein the control unit generates a second service execution request based on the service execution request, and wherein the communication unit transmits the second service execution request to another service providing device.

(13)

A server including:

a storage unit configured to store a device record that includes a service that is provided by at least one or more service providing devices, provision destination group information that indicates a provision destination group of the service, and provision cost information for the service;

a communication unit configured to receive an inquiry about a service providing device that is capable of providing a target service from a communication device; and a control unit configured to cause the communication unit to transmit the device record that includes the target service indicated by the inquiry that has been received by the communication unit to the communication device when the device record is stored in the storage unit.

(14)

The server according to (13), wherein the communication unit receives, from the communication device, a belonging group information issuance request for requesting issuance of belonging group information that indicates that the communication device belongs to the provision destination group, and wherein the control unit causes the belonging group information to be issued and causes the communication unit to transmit the belonging group information to the communication device.

(15)

The server according to (14), wherein, when the communication unit has received the belonging group information issuance request and issuance cost information for issuing the belonging group information from the communication device, the control unit causes the belonging group information to be issued.

(16)

A storage medium having a program stored therein, the program causing a computer to execute:

accepting a service execution request for requesting execution of a service;

specifying a service providing device to which a request for execution of a service provided by the service providing device is made based on a device record that includes the service and provision destination group information that indicates a provision destination group of the service, and the accepted service execution request; and transmitting the service execution request to the specified service providing device.

(17)

A storage medium having a program stored therein, the program causing a computer to execute:

receiving a service execution request from a communication device; and controlling a service execution unit to provide a service requested with the service execution request based on a device record that includes a service that is capable of being provided and provision destination group information that indicates a provision destination group of the service.

REFERENCE SIGNS LIST 1 camera
2 communication node
3 user terminal
4 user
10 communication device
11 control unit
12 storage unit
13 communication unit
14 connection unit
19 bus
20 execution unit
21 imaging unit
22 router
23 display unit
24 control unit
25 input unit
5 control device
6 display device
7 network
8 device master server
81 control unit
82 device registration communication unit
83 inquiry communication unit
84 inter-server communication unit
85 index DB
9 cost master server
91 control unit
92 certificate registration communication unit
93 certificate issuance communication unit
94 inter-server communication unit
95 group ID certificate DB
96 saved point DB

The invention claimed is:

1. A communication device, comprising:
an acceptation unit configured to accept a service execution request to request execution of a service;
a control unit configured to specify a service providing device to which a first request for execution of the service provided by the service providing device is made, based on a device record and the service execution request accepted by the acceptation unit,
wherein the device record includes the service, provision destination group information that indicates a provision destination group of the service, and provision cost information of the service; and
a transmission unit configured to:
transmit the service execution request to the service providing device specified by the control unit, and
transmit payment cost information that indicates a payment of a cost indicated by the provision cost information of the service to the specified service providing device based on the device record.

2. The communication device according to claim 1, wherein the control unit is further configured to further specify the service providing device indicated by the device record as the service providing device to which the service execution request is made, based on the device record that includes the service that corresponds to the first request and capability of the communication device to pay a provision cost for the service.

3. The communication device according to claim 1, wherein, the transmission unit is further configured to transmit belonging group information that indicates a first group to which the communication device belongs, based on transmission of the service execution request to the specified service providing device.

4. The communication device according to claim 3, wherein the control unit is further configured to control the transmission unit to transmit, to a server, a belonging group information issuance request, based on the first group that is absent in the provision destination group indicated by the provision destination group information, and
wherein the belonging group information issuance request corresponds to issuance of belonging group information that indicates that the communication device belongs to the provision destination group.

5. A first service providing device, comprising:
a storage unit configured to store a device record that includes a service that is executed, provision destination group information that indicates a provision destination group of the service, and provision cost information of the service;
a communication unit configured to receive a first service execution request from a communication device; and
a control unit configured to:
control a service execution unit to execute the service requested with the first service execution request based on the device record stored in the storage unit, and
receive payment cost information that indicates a payment of a cost indicated by the provision cost information of the service from the communication device.

6. The first service providing device according to claim 5, wherein the communication unit is further configured to transmit a result of the execution by the service execution unit to the communication device.

7. The first service providing device according to claim 5, wherein the communication unit is further configured to receiver belonging group information that indicates a first group to which the communication device belongs; and
wherein the control unit is further configured to control the service execution unit to execute the service, based on inclusion of the first group indicated by the belonging group information in the provision destination group indicated by the provision destination group information and reception of the payment cost information by the communication unit.

8. The first service providing device according to claim 5,
wherein the control unit is further configured to generate a second service execution request based on the first service execution request, and
wherein the communication unit is further configured to transmit the second service execution request to a second service providing device.

9. A server, comprising:
a storage unit configured to store a device record that includes a service that is provided by at least one of service providing device, provision destination group information that indicates a provision destination group of the service, and provision cost information for the service;
a communication unit configured to receive an inquiry about at least one service providing device that provides a target service from a communication device; and
a control unit configured to:
control the communication unit to transmit the device record that includes the target service indicated by the inquiry that has been received by the communication unit to the communication device based on the device record stored in the storage unit, and
control issuance of belonging group information, based on reception of a belonging group information issuance request and issuance cost information for issuance of the belonging group information by the communication unit.

10. The server according to claim 9,
wherein the communication unit is further configured to receive, from the communication device, the belonging group information issuance request to request issuance of the belonging group information that indicates that the communication device belongs to the provision destination group, and
wherein the control unit is further configured to:
control issuance of the belonging group information, and
control the communication unit to transmit the belonging group information to the communication device.

11. A non-transitory computer-readable medium having stored thereon computer-executable instructions for causing a computer to execute operations, the operations comprising:
accepting a service execution request for requesting execution of a service;
specifying a service providing device to which a first request for execution of the service provided by the service providing device is made, based on a device record and the accepted service execution request,
wherein the device record includes the service, provision destination group information that indicates a provision destination group of the service, and provision cost information of the service;
transmitting the service execution request to the specified service providing device; and
transmitting payment cost information that indicates payment of a cost indicated by the provision cost information of the service to the specified service providing device.

12. A non-transitory computer-readable medium having stored thereon computer-executable instructions for causing a computer to execute operation, the operation comprising:
receiving a service execution request from a communication device;
controlling a service execution unit to execute a service that is requested with the service execution request based on a device record that includes the service that is executed, provision destination group information that indicates a provision destination group of the service; and
controlling issuance of belonging group information, based on reception of a belonging group information issuance request and issuance cost information for issuing the belonging group information from the communication device.

* * * * *